(12) United States Patent
Hori et al.

(10) Patent No.: US 8,826,846 B2
(45) Date of Patent: Sep. 9, 2014

(54) INSTRUMENT DEVICE

(75) Inventors: Takashi Hori, Nagaoka (JP); Takeo Mizukoshi, Wako (JP)

(73) Assignees: Nippon Seiki Co., Ltd., Nagaoka-Shi, Niigata (JP); Honda Motor Co., Ltd., Tokyo (JP)

( * ) Notice: Subject to any disclaimer, the term of this patent is extended or adjusted under 35 U.S.C. 154(b) by 362 days.

(21) Appl. No.: 13/378,802

(22) PCT Filed: Mar. 31, 2010

(86) PCT No.: PCT/JP2010/055954
§ 371 (c)(1),
(2), (4) Date: Dec. 16, 2011

(87) PCT Pub. No.: WO2010/150583
PCT Pub. Date: Dec. 29, 2010

(65) Prior Publication Data
US 2012/0090532 A1    Apr. 19, 2012

(30) Foreign Application Priority Data

Jun. 22, 2009  (JP) .................................. 2009-147580

(51) Int. Cl.
*G01D 13/04* (2006.01)
*G01D 11/28* (2006.01)
*G01D 13/28* (2006.01)
(52) U.S. Cl.
CPC ................ *G01D 11/28* (2013.01); *G01D 13/28* (2013.01); *Y10S 116/05* (2013.01)
USPC .................... 116/286; 116/DIG. 5; 362/23.01
(58) Field of Classification Search
CPC ....... G01D 11/28; G01D 13/02; G01D 13/04; B60K 35/00

USPC ............ 116/286, 287, 288, DIG. 5, DIG. 36; 362/23.01, 23.12, 23.13, 23.16, 23.17, 362/23.19, 23.2
See application file for complete search history.

(56) References Cited

U.S. PATENT DOCUMENTS 4,975,807 A * 12/1990 Ohashi ............................ 362/23
7,374,323 B1 * 5/2008 Kelman et al. ................ 362/489
7,798,091 B2 * 9/2010 Suita et al. .................... 116/287

FOREIGN PATENT DOCUMENTS

CN        1823260      8/2006
CN      101334300     12/2008

(Continued)

OTHER PUBLICATIONS

Japanese Notification of Reasons for Rejection and English Translation, Japanese Application No. 2011-519648, dated May 21, 2013, 5 pages.

(Continued)

*Primary Examiner* — R. A. Smith
(74) *Attorney, Agent, or Firm* — Rankin, Hill & Clark LLP

(57) ABSTRACT

An instrument device which enhances a texture while creating a sense of depth by superimposing and stereoscopically disposing a light-guiding member on an indicator panel, and which has a good appearance and visibility when illuminated, is provided. The instrument device includes an indicator panel, an instrument main part, an indicator needle provided to the instrument main part, a transparent light-guiding member disposed on the indicator panel, and a light source that emits a light beam into the light-guiding member. The light-guiding member is provided with a light-guiding portion provided at the outer circumferential portion of the light-guiding member and which reflects the light beam from the light source in the direction toward the rotation center of the indicator needle, so that portions of the indicator panel shine like strips, and the indicator panel and the light-guiding member are illuminated in a stereoscopic manner.

5 Claims, 6 Drawing Sheets

(56) References Cited

FOREIGN PATENT DOCUMENTS

| | | |
|---|---|---|
| DE | 102006046402 A1 | 4/2008 |
| JP | 2000-213964 | 8/2000 |
| JP | 2002005697 A * | 1/2002 ............. G01D 11/28 |
| JP | 2003344115 A * | 12/2003 ............. G01D 11/28 |
| JP | 2004-340915 | 12/2004 |
| JP | 2006-126048 | 5/2006 |
| JP | 2006-153664 | 6/2006 |
| JP | 2007-003304 | 1/2007 |
| JP | 2007-052032 | 3/2007 |
| JP | 2007315769 A * | 12/2007 ............. G01D 11/28 |
| JP | 2008-116303 | 5/2008 |
| JP | 2008-116426 | 5/2008 |
| JP | 2008203061 A * | 9/2008 ............. G01D 11/28 |
| JP | 2009115703 A * | 5/2009 ............. G01D 11/28 |
| JP | 2011220778 A * | 11/2011 ............. G01D 11/28 |

OTHER PUBLICATIONS

Chinese Office Action with English translation dated Dec. 4, 2013, 17 pages.
European Search report dated Apr. 4, 2014, 3 pages.

* cited by examiner

INSTRUMENT DEVICE

TECHNICAL FIELD

The present invention relates to an instrument device which is installed in, for example, various types of vehicles including motorcycles and automobiles, boats and ships, and construction machines.

BACKGROUND ART

As the instrument device of this type such as an instrument device of an automobile, as disclosed in, for example, the following Patent Literature 1, an instrument device is known which has an indicator needle installed in an instrument main part, an indicator panel having an indicator portion such as a scale, a letter, and a number that are to be indicated by the indicator needle, a donut-shaped translucent substrate disposed on the indicator panel, and a light source that supplies light beam to the translucent substrate.

According to this instrument device, the translucent substrate is illuminated by the light beam which is supplied to the translucent substrate, and the indicator panel and the like are illuminated by the light beam which goes out from the translucent substrate to the exterior.

Therefore, a stereoscopic effect can be obtained by superimposing the indicator panel and the translucent substrate, and the translucent substrate and the indicator panel can be illuminated.

PRIOR ART DOCUMENT

Patent Literature

Patent Literature 1: Unexamined Japanese Patent Application KOKAI Publication No. 2007-3304

DISCLOSURE OF INVENTION

Problem to be Solved by the Invention

However, according to the above-described prior-art configuration, although a scale, a letter, a number and the like put in the indicator panel or the translucent substrate can be visually recognized with a sense of depth, the translucent substrate is dully illuminated by the light beam supplied to the translucent plate or the space above a dial plate is dully illuminated by the light supplied from the translucent substrate, so that the illumination becomes uniform. Consequently, from the standpoint of illumination design, the stereoscopic effect is poor, resulting in the lack of novelty.

The present invention has been made in view of the above-explained problem, and it is an object of the present invention to provide an instrument device which has an enhanced texture while creating the sense of depth by a translucent member superimposed and stereoscopically disposed on an indicator panel of the instrument device, and which has a good appearance and an novel visibility when illuminated.

Means for Solving the Problem

In order to overcome the above-explained problem, an instrument device according to the present invention is an instrument device that includes an indicator panel, an instrument main part which is disposed at a rear face side of the indicator panel, an indicator needle which is provided so as to rotate and give an indication in accordance with an operation of the instrument main part along a front face side of the indicator panel, a transparent light-guiding member which is disposed on the indicator panel and which can be seen through, and a light source which enters light beams into the light-guiding member, wherein the light-guiding member is provided with a plurality of light-guiding portions which are disposed at an outer circumferential portion of the light-guiding member with predetermined intervals, and which reflect and guide light beams from the light source inwardly to the light-guiding member with directivity, and a light reflective portion which reflects and guides the light beams emitted from the light source so that the light beams are directed toward a side from which a person views via the light-guiding portions are formed at a rear face of the light-guiding member.

By employing the configuration as described above, light beams from the light source are guided inwardly to the light-guiding member via the plurality of light-guiding portions disposed at the outer circumferential portion of the light-guiding member with the directivity, and the guided light beams are reflected and guided as spots toward a side from which a person views by the light reflective portion, and the areas is observed to shine. At this time, portions of the indicator panel shine like strips or lines, and the indicator panel and the light-guiding member are stereoscopically illuminated, so that the instrument device which has a good appearance and a novel visibility can be provided.

Moreover, the instrument device is characterized by light beams from the light source that are reflected and guided toward a rotation center of the indicator needle by the light-guiding portions of the light-guiding member.

By employing the configuration as described above, light beams from the light source are reflected and guided toward the center direction of the light-guiding member, i.e., the direction toward rotation center of the indicator needle via the plurality of light-guiding portions disposed at the outer circumferential portion of the light-guiding member, so that portions of the indicator panel shine like strips with predetermined intervals, and the indicator panel and the light-guiding member are stereoscopically illuminated for indication, so that the instrument device which has a good appearance and a novel visibility can be provided.

Furthermore, the instrument device is characterized in that a scale which is indicated by the indicator needle is formed on the light-guiding member or in the indicator panel on a line interconnecting the light-guiding portion and a rotation center of the indicator needle.

By employing the configuration as described above, as an area shining by light reflected and guided as a spot toward a side from which a person views by the light reflective portion, area on the line interconnecting the light-guiding portion and the rotation center of the indicator needle and corresponding to the area of the scale is observed to shine by reflected and guided light as a spot, so that the area of the scale is observed distinctly. In addition, the indicator panel and the light-guiding member are stereoscopically illuminated for indication, so that the instrument device which has a good appearance and a novel visibility can be provided.

Also, the instrument device is characterized in that a convex scale which protrudes integrally from the light-guiding member is formed on a front face side of the light-guiding member.

By employing the configuration as described above, portions of the indicator panel shine like strips with predetermined intervals, and the indicator panel and the light-guiding-member side are formed more stereoscopic by the convex scale, thereby providing the instrument device which has a good appearance and a novel visibility.

Also, the instrument device is characterized by the convex scale that is formed on a line interconnecting the light-guiding portion and a rotation center of the indicator needle.

By employing the configuration as described above, the portion can be formed stereoscopically by the convex scale, and as an area where shining by reflected and guided light toward a side from which a person views as spots by the light reflective portion, area on the line interconnecting the light-guiding portion and the rotation center of the indicator needle and corresponding to the area of the convex scale is observed to shine by reflected and guided light as spots, so that the area of the convex scale is observed distinctly, and thus the instrument device which has a good appearance and a novel visibility can be provided.

The instrument device is characterized by a translucent portion that is formed at the portion of the indicator panel positioned behind the convex scale.

By employing the configuration as described above, the convex scale is visually recognized through the translucent portion formed on the indicator panel, and it becomes possible to illuminate the convex scale through the translucent portion, and light beams from the light source is reflected and guided in the center direction of the light-guiding member via the plurality of light-guiding portions disposed at the outer circumferential portion of the light-guiding member, so that portions of the indicator panel are brilliantly illuminated like strips with predetermined intervals, and the indicator panel and the light-guiding member are stereoscopically illuminated, thereby providing the instrument device which has a good appearance and a novel visibility.

Effect of the Invention

The present invention can provide an instrument device that includes an instrument main part which is disposed at a rear face side of an indicator panel, an indicator needle which is provided so as to rotate and give an indication in accordance with an operation of the instrument main part along a front face side of the indicator panel, a transparent light-guiding member which is disposed on the indicator panel and which can be seen through, and a light source which enters light beams into the light-guiding member, wherein the light-guiding member is provided with a plurality of light-guiding portions which are disposed at an outer circumferential portion of the light-guiding member with predetermined intervals, and which reflect and guide light beams from the light source inwardly to the light-guiding member with directivity, and a light reflective portion which reflects and guides the light beams emitted from the light source so that the light beams are directed toward a side from which a person views via the light-guiding portions disposed at the outer circumferential portion of the light-guiding member are formed at a rear face of the light-guiding member, so that light beams from the light source are guided inwardly to the light-guiding member via the plurality of light-guiding portions disposed at the outer circumferential portion of the light-guiding member with directivity, and the guided light beams are reflected and guided toward a side from which a person views as spots by the light reflective portion, thus the areas are observed to shine. At this time, portions of the indicator panel shine like strips or lines, and the indicator panel and the light-guiding member are stereoscopically illuminated, so that the instrument device which has a good appearance and a novel visibility can be provided.

BEST MODE FOR CARRYING OUT THE INVENTION

Hereinafter, with reference to the accompanying figures, an explanation is given of an embodiment in which the present invention is applied to a vehicular instrument device.

Figure 1:
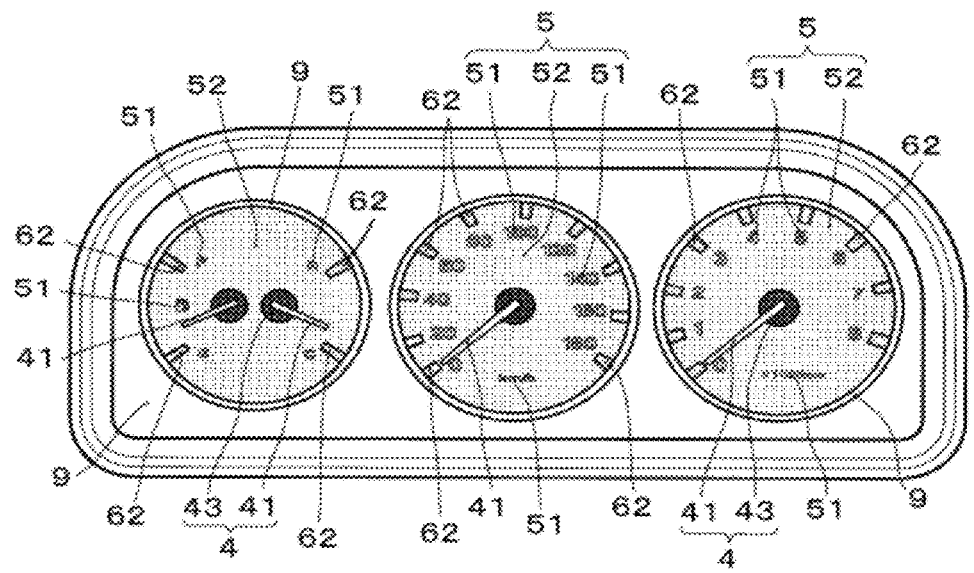
FIG. 1 is a front view showing an instrument device according to a first embodiment of the present invention.
Figure 2:
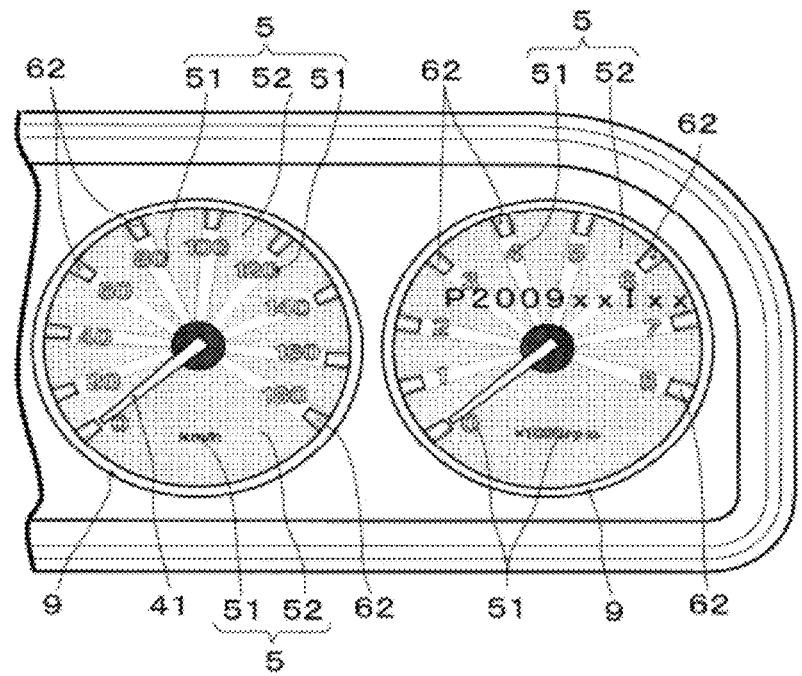
FIG. 2 is a front view showing a general illuminated state of the instrument device according to the first embodiment of the present invention.
Figure 3:
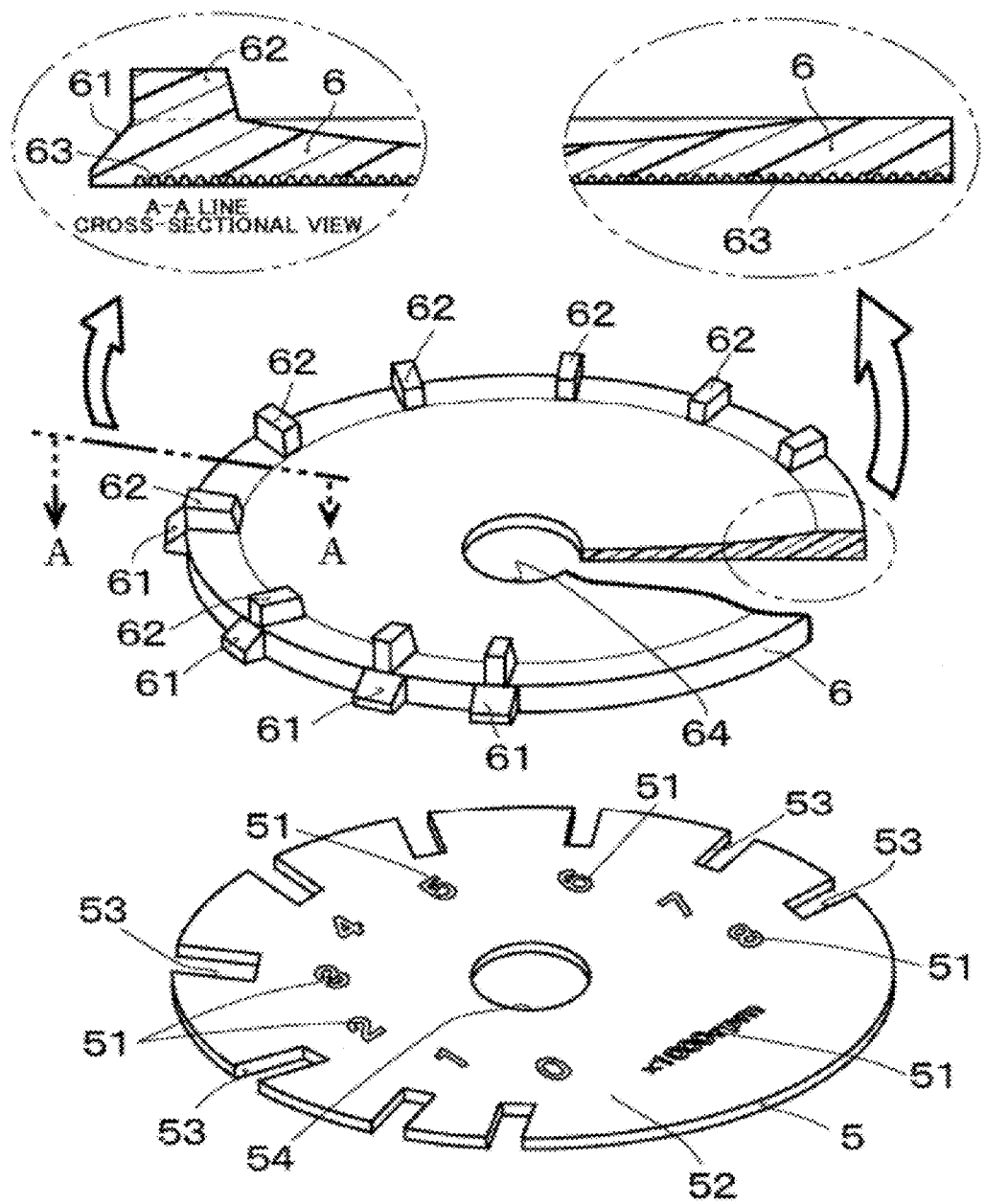
FIG. 3 is major-part exploded perspective view and partial enlarged cross-sectional view showing an indicator panel and a light-guiding member of the instrument device according to the first embodiment.
Figure 4:
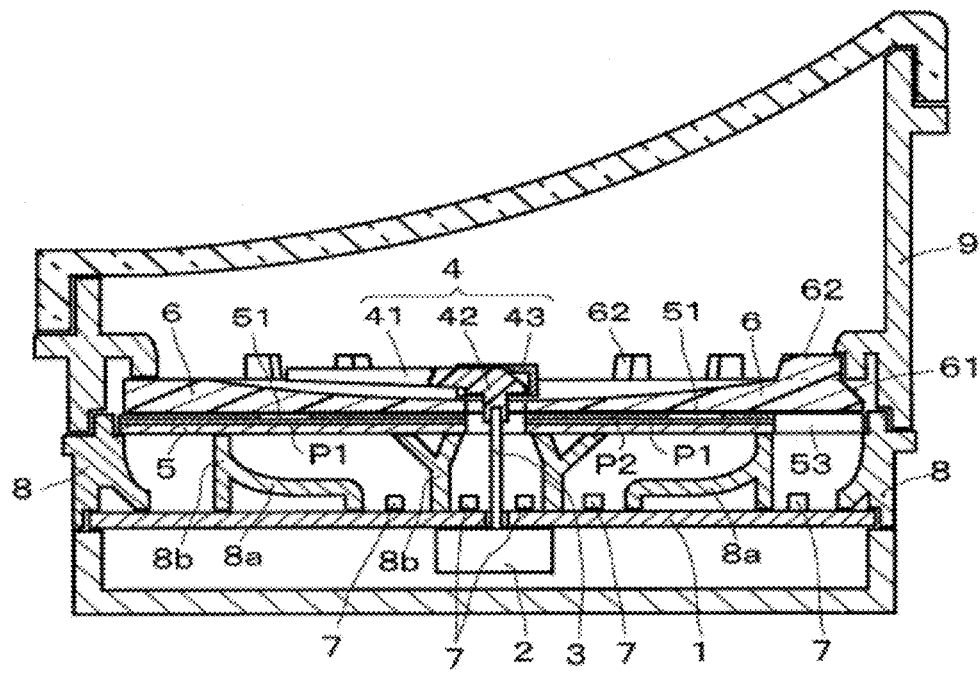
FIG. 4 is a cross-sectional view showing a major part of FIG. 1.
Figure 5:
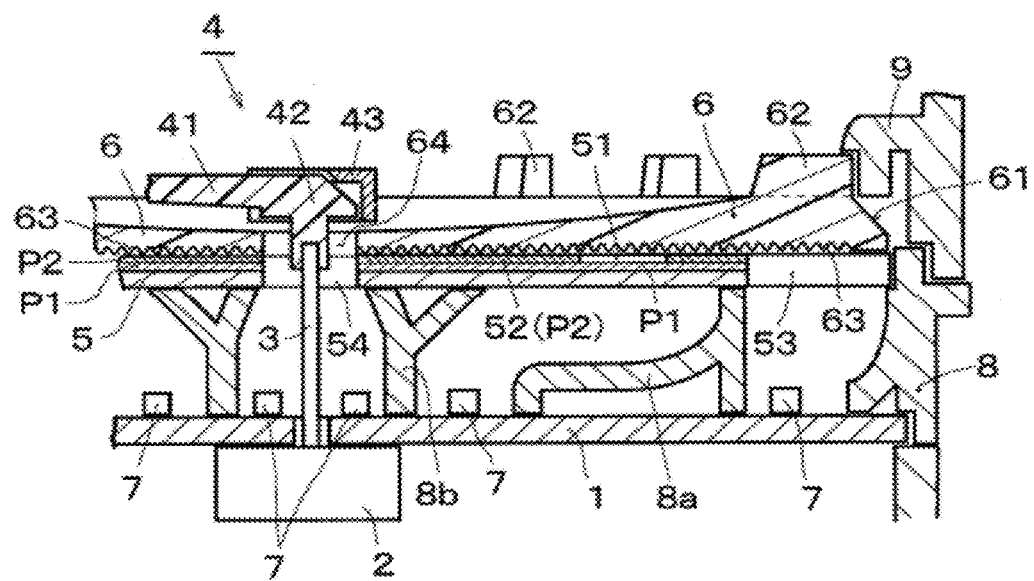
FIG. 5 is an enlarged cross-sectional view of FIG. 4.

FIG. 1 to FIG. 5 show a first embodiment of the present invention, and the embodiment of the present invention is hereinafter explained based on those figures. Note that FIG. 1 is a front view of an instrument device of the first embodiment of the present invention, FIG. 2 is a front view showing a general illuminated state of the instrument device of FIG. 1, FIG. 3 is major-part exploded perspective view and partial enlarged cross-sectional view of an indicator panel and a light-guiding member of the embodiment, FIG. 4 is a cross-sectional view showing a major part of FIG. 1, and FIG. 5 is an enlarged cross-sectional view of FIG. 4.

In those figures, the instrument device of the present embodiment includes a circuit board 1, an instrument main part 2 which is electrically connected to and which is mechanically mounted on and fixed to the circuit board 1 at the rear face side thereof, a rotation shaft 3 which is provided to the instrument main part 2 and which extends through the circuit board 1 to the forward front side of the circuit board 1, an indicator needle 4 that is mounted and fixed to the upper end of the rotation shaft 3, an indicator panel 5 that is located behind the indicator needle 4, a see-through and translucent light-guiding member 6 that is superimposed and disposed on the indicator panel 5 at a front side thereof, a plurality of light sources 7 that are mounted on the circuit board 1, a casing 8 having a reflector 8a and a partition wall 8b that are provided between the indicator panel 5 and the circuit board 1, and a facing panel 9 which is provided at the front side of the indicator panel 5 and the light-guiding member 6, and which has an opening for a visually recognizable indicator region of the indicator panel 5 and a visually recognizable indicator region of the light-guiding member 6.

The circuit board 1 is a hard circuit board which includes, for example, a glass-epoxy-based basal substrate and a wiring pattern (unillustrated) provided thereon, and the wiring pattern is electrically connected to a light source to be described later, a drive circuit (unillustrated) which drives and controls, for example, the instrument main part 2, and various circuit components (unillustrated), such as a resistor and a capacitor.

The instrument main part 2 is a moving-magnet type instrument or a stepping motor, and in this example, the instrument main part 2 is mounted on the back side of the circuit board 1 so that the rotation shaft 3 passes through a shaft hole formed in the circuit board 1, and is electrically connected to the wiring pattern by appropriate electrical conduction means such as soldering, but the instrument main part 2 may be positioned on the front side of the circuit board 1.

The indicator needle 4 is made of a translucent synthetic resin, and includes an indicator member 41 which gives an indication corresponding to an indicator portion which is included in the indicator panel 5 or the light-guiding member 6 to be described later, an indicator basal part 42 which is formed together with the indicator member 41 and which is mounted to and fixed to the rotation shaft 3, and a cover member 43 which is made of a light-blocking synthetic resin that covers the indicator basal part 42 and the rotation center side of the indicator member 41.

In the indicator panel 5, indicator portions 51 which are arranged in an arc-like area along the rotation orbit of the indicator needle 4 and which include a letter, a number, and a symbol to be indicated by the indicator needle 4 and a ground-color portion 52 which is the background of the indicator portion 51 are formed by means of printing, etc. In this embodiment, printing is performed on the front face of the indicator panel 5, but may be performed on the rear face thereof.

Moreover, translucent portions 53 which include openings and notches that open the indicator panel 5 itself are formed at the outside of the indicator portions 51 in the indicator panel 5, and scales to be described later of the light-guiding member 6 are allocated opposite to the positions of the translucent portions 53. Although, the translucent portions 53 include openings and notches in the present embodiment, the translucent portions 53 may be formed by offprinting in such a manner that some portions of the ground-color portion 52 are not printed.

The ground-color portion 52 forms a background of the indicator portions 51, and is formed in the area except the areas of the indicator portions 51. These indicator portions 51 and ground-color portion 52 are formed by means like screen-printing to a translucent sheet substrate that is a base member (basal material) of the indicator panel 5, and the translucent portions 53 are formed by means of punching, etc., after the printing is performed to the indicator panel 5 in the present embodiment.

That is, a first printed layer P1 is printed and formed on the substantially entire area of the surface of a substrate which is made of a translucent synthetic resin sheet. The first printed layer P1 is formed from, for example, a white semi-transparent ink, and the first printed layer P1 itself is visually recognized with a white color by a reflection of external light when the light source 7 is turned off, and is illuminated and transmits the light with a white color when the light source 7 is turned on because that light beams emitted from the light source 7 go through the first printed layer P1.

Moreover, a second printed layer P2 is printed and formed on the front side of the first printed layer P1 other than the areas of each indicator portion 51 which includes a letter, a number, and a symbol. The second printed layer P2 is formed from, for example, a black ink having a light blocking characteristic, and the areas where no second printed layer P2 is formed and the first printed layer P1 is exposed form the indicator portions 51.

Therefore, each indicator portion 51 which is the area where the first printed layer P1 is exposed and which includes the letter, the number and the symbol is visually recognized with a white color when the light source 7 is turned off. When the light source 7 is turned on, each indicator portion 51 is illuminated by the light from the light source 7 and transmits the light with a white color in the form of the indicator portions 51.

Note that the indicator panel 5 has a through hole 54 formed at a position corresponding to the rotation shaft 3 at the instrument main part 2, and the rotation shaft 3 and the indicator needle 4 are provided so as to be coupled together through the through hole 54.

The light-guiding member 6 is made of a transparent and translucent synthetic resin, and disposed at the front side of the indicator panel 5 so as to be superimposed thereon.

The light-guiding member 6 has light-guiding portions 61 that are a plurality of reflective surfaces which are provided at predetermined intervals at the outer circumferential portion of the light-guiding member 6 and which reflect and guide light beams from the light source 7 inwardly to the light-guiding member 6 with directivity. According to the first embodiment, the light-guiding portions 61 that are a plurality of reflective surfaces which are provided at the predetermined intervals at the outer circumferential portion of the light-guiding member 6 and which reflect the light beams from the light source 7 in the center direction (the direction toward rotation center of the indicator needle 4) of the light-guiding member 6 with directivity are formed. In this case, the light-guiding member 6 is formed so that the thickness of the center side becomes thinner than the thickness of the outer circumferential portion, and thus the light beams guided via the light-guiding portions 61 are likely to be guided in the center direction.

Moreover, convex scales 62 which are projected integrally from the light-guiding member 6 are formed at the front face side of the light-guiding member 6. In this case, the convex scales 62 are formed correspondingly on respective lines interconnecting respective light-guiding portions 61 and the rotation center of the indicator needle 4.

Furthermore, the translucent portions 53 which include the above-described openings and notches are provided at the positions of the indicator panel 5 located behind the convex scales 62 which are formed on the light-guiding member 6 so that the translucent portions 53 and the convex scales 62 each are opposed to each other.

Also, at the rear face of the light-guiding member 6 where the light-guiding member 6 and the indicator panel 5 face with each other, a light reflective portion 63 which reflects and guides the light beam emitted from the light source 7 is formed, so that the light beams are directed toward a side from which a person views via the light-guiding portions 61 that are the reflective surfaces of the light-guiding member 6. In this case, the light reflective portion 63 is diffused reflective portion formed of fine concavities and convexities.

Note that an opening 64 in which an indicator needle shaft 3 can be inserted is formed at the center of the light-guiding member 6 in accordance with the shape of the indicator panel 5.

The light sources 7 are mounted at appropriate places on the circuit board 1. In the present embodiment, light sources 7 for illuminating the indicator member 41 of the indicator needle 4, the light sources 7 which illuminate the indicator portions 51 which include the letter, the number, and the symbol included in the indicator panel 5, and the light sources 7 for supplying the emitted light beams into the light-guiding-portions-61 side of the light-guiding member 6 and the convex-scales 62 side each are mounted on the circuit board 1.

The casing 8 is provided with the reflector 8a for reflecting and guiding the light beams from the light source 7 that is for illuminating the indicator portions 51 to the indicator portions 51 of the indicator panel 5, the partition wall 8b which is a substantially cylinder partitioned for illuminating the indicator needle 4 and the partition wall 8b which is a substantially cylinder that partitions a space between the areas corresponding to the indicator portions 51 and the areas corresponding to the convex scales 62 provided at the outer circumferential side of the indicator portions 51.

According to the instrument device of the first embodiment employing the configuration as described above, when the indicator needle 4, the indicator panel 5, and the light-guiding member 6 are illuminated in the night or the like, by turning on the light sources 7 like LEDs which are disposed at the back side of the indicator panel 5, the indicator member 41 of the indicator needle 4 is illuminated, the indicator portions 51 of the indicator panel 5 are illuminated and transmit the light with a white color, and the convex scales 62 formed on the light-guiding member 6 are illuminated via the translucent portions 53 that include the openings and notches provided in the indicator panel 5. Moreover, the shapes of the indicator panel 5 and the light-guiding-member 6 side are stereoscopically formed by the convex scales 62, while at the same time, the convex scales 62 are recognized so as to be defined by the emitted light beams from the light sources 7, so that the instrument device which has a good appearance and a novel visibility can be provided.

At the same time, the light beams from the light source 7 are reflected and guided like spots with directivity in the light-guiding member 6 toward the center of the light-guiding member 6, i.e., the rotation center of the indicator needle 4 via the plurality of light-guiding portions 61 located and disposed at the outer side than at the areas of the translucent portions 53, so that some band-like portions of the indicator panel 5 are observed to be emit light with predetermined intervals, and thus the indicator panel 5 and the light-guiding member 6 are illuminated so as to be partially defined in a stereoscopic manner.

At this time, at the rear face of the light-guiding member 6, the light reflective portion 63 formed of the diffused reflective portion including fine concavities and convexities that reflect and guide the light beams emitted from the light source 7 is provided, so that the light beams are directed toward a side from which a person views via the light-guiding portions, and thus the light beams emitted from the light source 7 are reflected and guided as spots toward the side from which a person views on the indicator panel 5 by the light reflective portions 63, and the areas are observed to shine.

Moreover, by disposing the convex scales 62 at the positions on respective lines interconnecting respective light-guiding portions 61 of the light-guiding member 6 and the rotation center of the indicator needle 4, the lines interconnecting respective light-guiding portions 61 and the rotation center of the indicator needle 4 and corresponding to the convex scales 62 are observed to shine by reflecting and guiding light as spots, so that the areas of the convex scales 62 are observed distinctly, and the stereoscopic effect is created.

Figure 6:
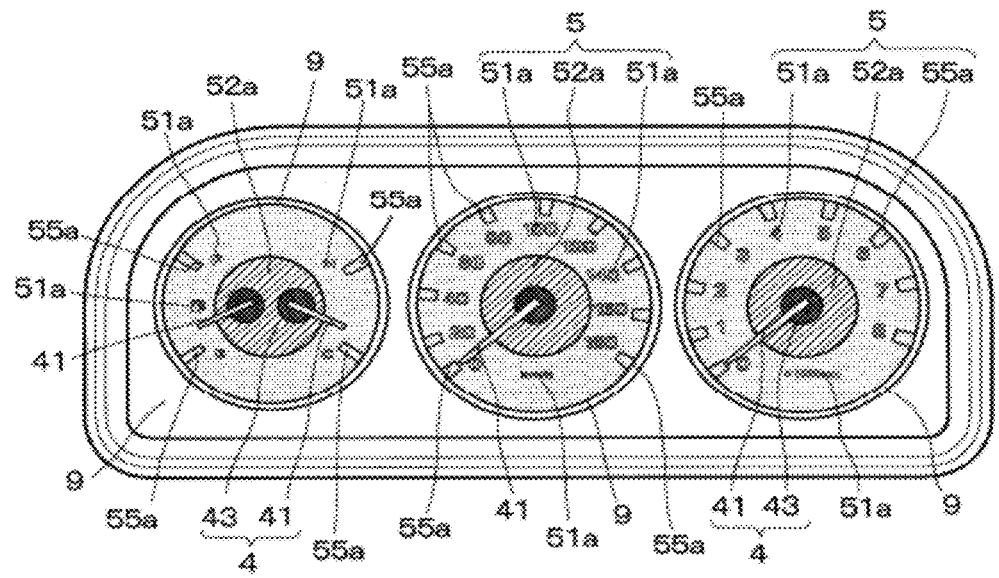
FIG. 6 is a front view showing an instrument device according to a second embodiment of the present invention.
Figure 7:
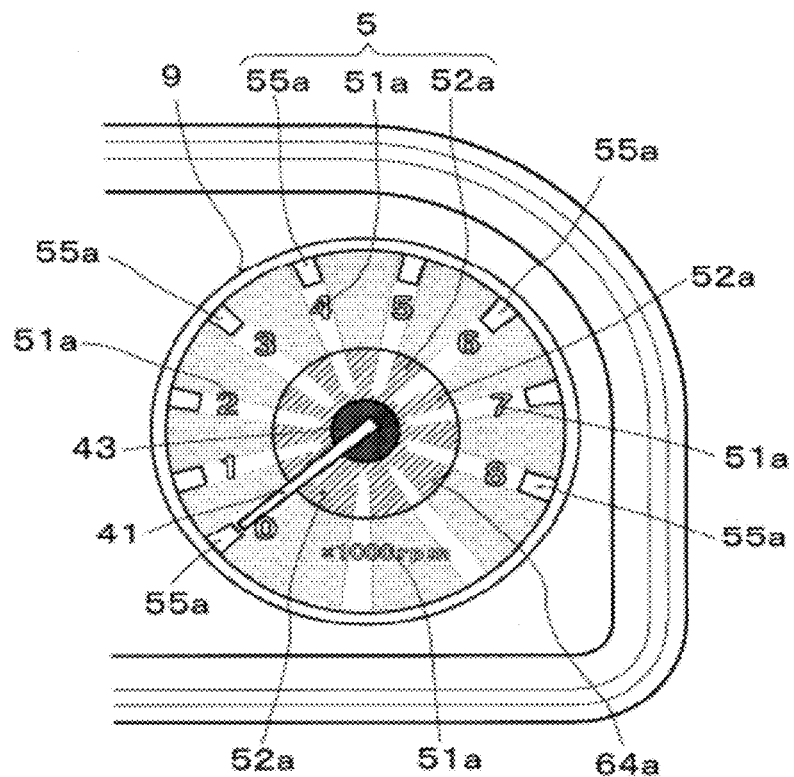
FIG. 7 is a front view showing a general illuminated state of the instrument device according to the second embodiment of the present invention.
Figure 8:
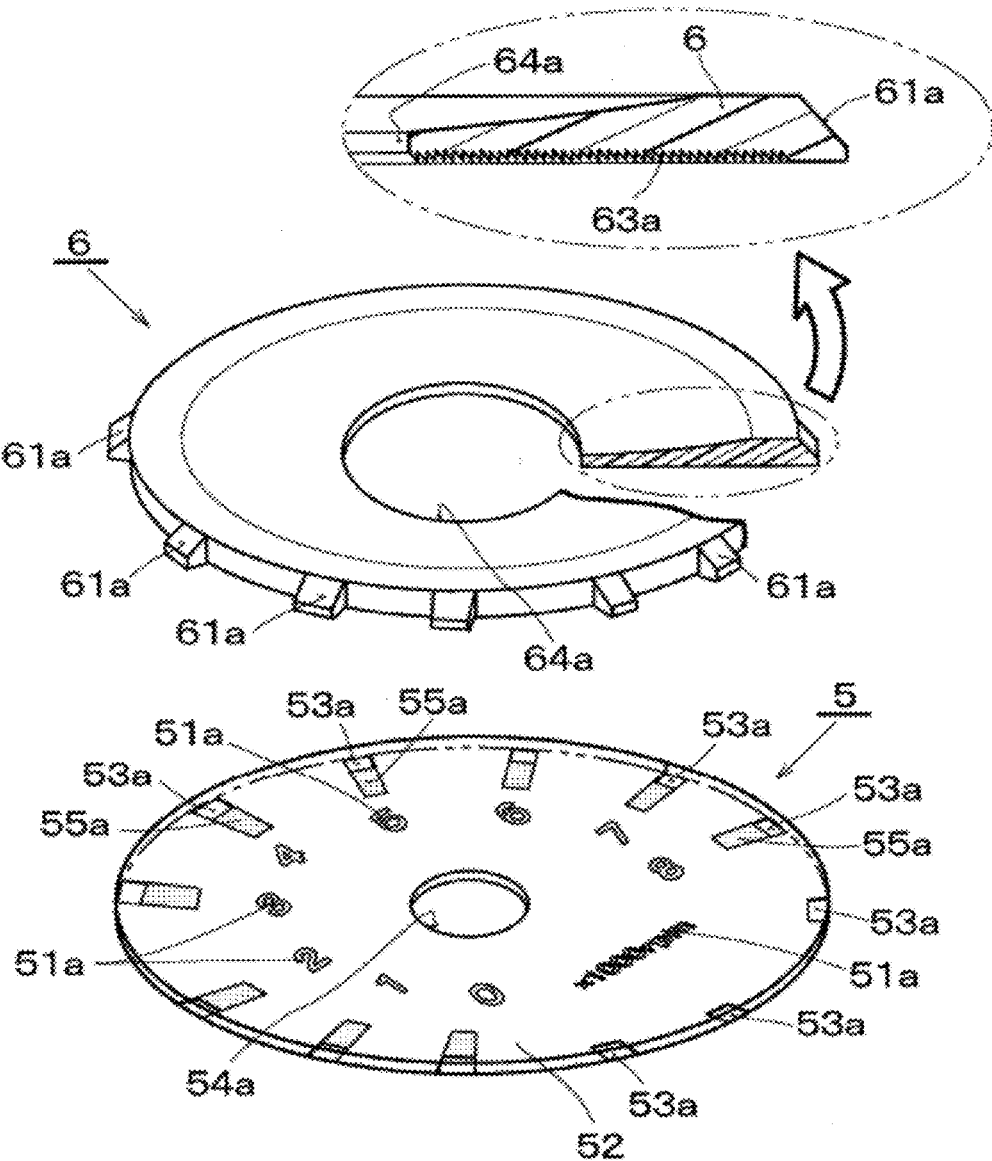
FIG. 8 is major-part exploded perspective view and partial enlarged cross-sectional view showing an indicator panel and a light-guiding member of the instrument device according to the second embodiment.
Figure 9:
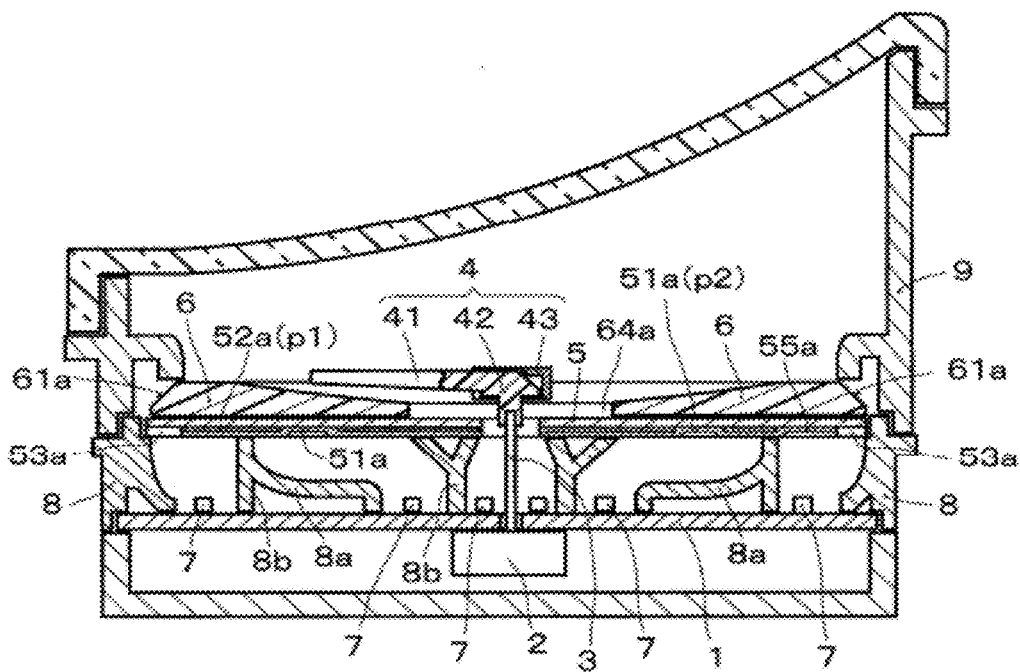
FIG. 9 is a cross-sectional view showing a major part of FIG. 6.
Figure 10:
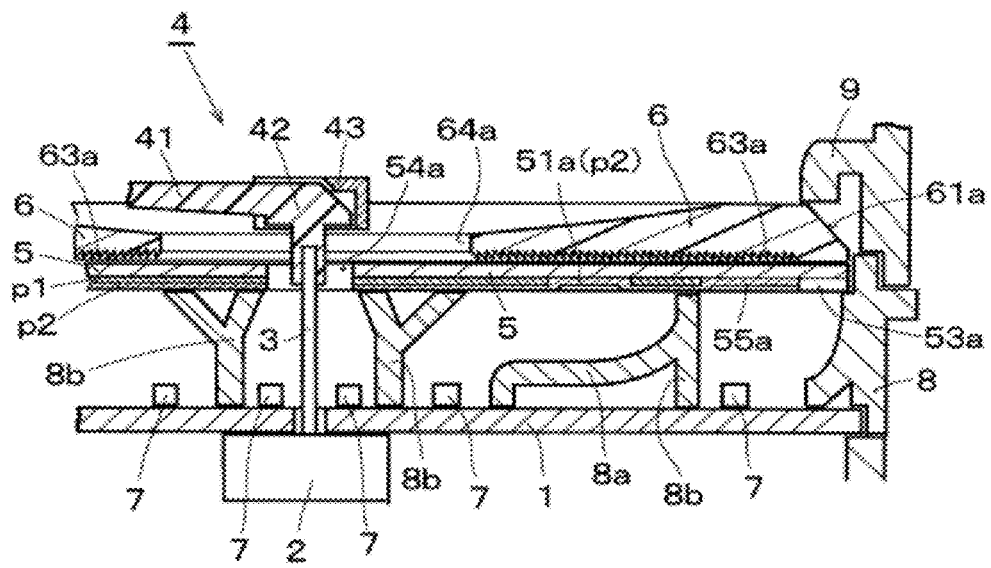
FIG. 10 is an enlarged cross-sectional view of FIG. 9.

FIG. 5 to FIG. 10 show a second embodiment of the present invention, and FIG. 6 is a front view showing an instrument device of the second embodiment of the present invention, FIG. 7 is a front view showing a general illuminated state of the instrument device of FIG. 6, FIG. 8 is major-part exploded perspective view and partial enlarged cross-sectional view showing an indicator panel and a light-guiding member of the second embodiment, FIG. 9 is a cross-sectional view showing a major part of FIG. 6, and FIG. 10 is an enlarged cross-sectional view of FIG. 9.

According to the second embodiment, in an indicator panel 5, indicator portions 51a which include a letter, a number, and a symbol like "km/h" and "×1000 rpm" to be indicated by an indication instrument, such as a speedometer or an engine tachometer, and which include a number to be indicated by the indicator needle of the speedometer or the engine tachometer, and a ground-color portion 52a which is a background of the indicator portions 51a are formed by means of print or the like, and scales 55a which are arranged in an arc-like area along the rotation orbit of the indicator needle 4 are formed by offprint of the portions of the ground-color portion 52a in the same way as the areas of the indicator portions 51a. Moreover, the areas of translucent portions 53a are formed by offprinting in the same way as the scales 55a. Note that respective positions of the translucent portions 53a are located at the outer circumferential portion side of the areas of the scales 55a on the indicator panel 5.

In the second embodiment, the indicator portions 51a, the ground-color portion 52a, and the scales 55a, etc., are formed by printing at the rear face of the indicator panel 5, and a first rear face printed layer p1 is printed and formed at the rear face of the indicator panel 5, other than the areas of each indicator portion 51a that includes a number, a letter, and a symbol, the areas of the scales 55a, and the areas of the translucent portions 53a. The indicator panel 5 is made of a transparent synthetic-resin sheet substrate. The first rear face printed layer p1 is formed by printing, for example, a black and light-blocking ink that will become the ground-color portion 52a of the indicator panel 5.

A second rear face printed layer p2 which is formed from a white semi-transparent ink is printed on the ground-color portion 52a in a superimposed manner other than the areas of the translucent portions 53a.

Therefore, the indicator portions 51a and the scales 55a where no first rear face printed layer p1 is formed are visually recognized with a white color when the light sources 7 are turned off, and when the light sources 7 are turned on, emitted light beams therefrom pass through the second rear face printed layer p2, and the indicator portions 51a and the scales 55a are illuminated and transmit the light with a white color.

Note that the indicator panel 5 has a through hole 54a formed at a position corresponding to the rotation shaft 3 at the instrument main part 2, and the rotation shaft 3 and the indicator needle 4 are provided so as to be coupled together through the through hole 54a, likewise the first embodiment.

The light-guiding member 6 is made of a transparent and translucent synthetic resin and is in a substantially donut-shape having a circular opening 64a at the center along the rotation orbit of the indicator needle 4, and the light-guiding member 6 is disposed at the front side of the indicator panel 5 so as to be superimposed thereon.

Light-guiding portions 61a that are a plurality of reflective surfaces which are provided at the outer circumferential portion of the light-guiding member 6 with predetermined intervals and which reflect the light beams from the light source 7 in the center direction (the direction toward rotation center of the indicator needle 4) of the light-guiding member 6 with directivity are formed, and at the rear face of the light-guiding member 6 where the light-guiding member 6 and the indicator panel 5 face with each other, a light reflective portion 63a which reflects and guides the light beams emitted from the light source 7 is formed so that the light beams are directed toward a side from which a person views via the light-guiding portions 61 that are reflective surfaces of the light-guiding member 6. In this case, the light reflective portion 63*a* is formed of reflective portions (hairlines) which are concentric fine grooves like the teeth of a saw.

Moreover, the light-guiding portions 61*a* are formed at the outer circumferential portion area of the light-guiding member 6 which is opposite to the areas of the translucent portions 53*a* (the areas of offprinting) located outside and adjacent to the areas of the scales 55*a* of the indicator panel 5, and the light-guiding portions 61*a* are also formed in the same manner at the area other than the outward areas of the scales 55*a* with appropriate intervals. In the present embodiment, the light-guiding portions 61*a* which are reflective surfaces are formed at the outer circumferential portion area of the light-guiding member 6 that faces the translucent portions 53*a* which are provided at areas of the indicator panel 5 below a "scale" position that is a lowermost indication position by the indicator needle 4 and a "maximum scale" position and which are provided at the outer circumferential portion area of the indicator panel 5 with appropriate intervals when the instrument device is a speedometer or an engine tachometer, etc.

The light sources 7 are mounted at appropriate places on the circuit board 1, and in the present embodiment, the light sources 7 for illuminating the indicator member 41 of the indicator needle 4, the light sources 7 which illuminate the indicator portions 51*a* which include the number, the letter, and the symbol and the scales 55*a* of the indicator panel 5, and the light sources 7 for supplying the emitted light beams into the light-guiding-portions-61*a* side of the light-guiding member 6 are respectively mounted on the circuit board 1.

The casing 8 is provided with the reflector 8*a* for reflecting and guiding the light beams to the indicator portions 51*a* of the indicator panel 5 from the light source 7 that is for illuminating the indicator portions 51*a*, the partition wall 8*b* which are substantially cylindrical partitioned for illuminating the indicator needle 4, and the partition wall 8*b* which are substantially cylindrical that partitions a space between areas corresponding to the indicator portions 51*a* and areas corresponding to the scales 62*a* provided at the outer circumferential side of the indicator portions 51*a*.

According to the instrument device of the second embodiment employing the configuration as described above, when the indicator needle 4, the indicator panel 5, and the light-guiding member 6 are illuminated in the night for example, by turning on the light source 7, the indication member 41 of the indicator needle 4 is illuminated, and the indicator portions 51*a* and the scales 55*a* included in the indicator panel 5 are illuminated and transmit the light with a white color by the second rear surface printed layer p2.

Note that the translucent color is not limited to the white color described in the embodiments, but for example by painting the second rear face printed layer p2 in different colors with transparent inks like blue and red, it is possible to illuminate the indicator portions 51*a* and the scales 55*a* with respective illumination colors thereof being set to arbitrary coloring.

At the same time, illumination light beams from the light source 7 are entered in the light-guiding-member-6 side through the respective areas of the translucent portions 53*a* formed in the indicator panel 5 by offprinting, and the light beams from the light source 7 are reflected and guided with the directivity linearly with predetermined widths inside the light-guiding member 6 in the center direction of the light-guiding member 6, i.e., the direction toward rotation center of the indicator needle 4 via the light-guiding portions 61*a* that are the reflective surface, and thus areas like strips or lines with predetermined intervals are observed to shine on the indicator panel 5, so that the indicator panel 5 and the light-guiding member 6 are illuminated so as to be partially defined in a stereoscopic manner.

At this time, the light reflective portion 63*a* that is concentric fine grooves like the teeth of a saw which reflect and guide the light beams emitted from the light source 7 is provided at the rear face of the light-guiding member 6, so that the light beams is directed toward a side from which a person views via the light-guiding portions 61 that are reflective surfaces of the light-guiding member 6 and thus the light beams emitted from the light source 7 are reflected and guided as spots toward a side from which a person views on the indicator panel 5 by the light reflective portion 63*a*, and this area is observed to shine.

Moreover, by disposing the scales 55*a* of the indicator panel 5 at the positions on respective lines interconnecting respective light-guiding portions 61*a* and the rotation center of the indicator needle 4, the areas on the lines interconnecting respective light-guiding portions 61*a* and the rotation center of the indicator needle 4 and corresponding to the areas of the scales 55*a* are observed to shine as spots by reflected and guided light, so that the areas of the scales 55*a* and the indicator portions 51*a* are observed distinctly, and thus the instrument device having a good appearance and a novel visibility is provided.

The light beams which are reflected and guided via the light-guiding portions 61*a* of the light-guiding member 6 provided at the places distant from the positions of the scales 55*a* of the indicator panel 5 are also reflected and guided like lines toward the rotation center of the indicator needle 4 with the predetermined intervals, and areas like strips or lines observed to shine with predetermined intervals on the indicator panel 5, so that the indicator panel 5 and the light-guiding member 6 are illuminated so as to be partially defined in a stereoscopic manner.

Moreover, since the light-guiding member 6 according to the present embodiment is substantially in a donut-shape having the opening 64*a* opened in a circular form at the center along the rotation orbit of the indicator needle 4, some of the light beams reflected and guided through the light-guiding portions 61*a* of the light-guiding member 6 go out from the inner face of the circular opening 64*a*, and the surface of the indicator panel 5 is partially illuminated, and the areas like strips or lines on the indicator panel 5 are illuminated with brightness and darkness, so that an effect of a good appearance and a novel illumination can be obtained.

Note that in respective embodiments, by changing the turn-on timings of the light source 7 for illuminating the indication member 41 of the indicator needle 4, the light source 7 which illuminates the indicator portions 51 and 51*a* which include the letter, the number, and the symbol included in the indicator panel 5, and the light source 7 for supplying the emitted light beam to the light-guiding-portion-61 and 61*a* side of the light-guiding member 6 and the scales (convex scales 62 and scales 55*a*) side, the indicator needle 4, the indicator portions 51 and 51*a* that include the number, the letter, and the symbol, and the scales (the convex scales 62 which are provided on the light-guiding member 6 and the scales 55*a* which are included in the indicator panel 5), etc., are illuminated with time differences, which enables to provide the instrument device that is further novel and interesting. Note that in some cases, the light source 7 for supplying light beam to the light-guiding-portion-61 side of the light-guiding member 6 and the light source 7 which supplies emitted light beam to the scales (convex scales 62 and scales 55a) 62 side may be individually disposed, and may be caused to turn on with time differences.

The present invention is not limited to the above-described embodiments, and can be changed and modified in various forms within the scope of the present invention. For example, the light-guiding member 6 is formed of a colorless and transparent synthetic resin material in the first and second embodiments, but may be formed with a color by mixing, for example, a blue color colorant. In this case, the indicator portions 51 and 51a and the scales 55a, etc., which are included in the indicator panel 5 can be read through a given color, and in the first embodiment, the convex scales 62 which protrude toward the front face side of the light-guiding member 6 are formed as the scales, but concave scales that are recesses in the front or rear face of the light-guiding member 6 may be formed, and the scales may be formed on each of the light-guiding member 6 and the indicator panel 5 as needed, and depending on such a combination, the sense of depth can be further enhanced.

Moreover, respective positions where the plurality of light-guiding portions 61 and 61a are disposed which are provided at the outer circumferential portion of the light-guiding member 6 with predetermined intervals and which reflect the light beams from the light source 7 in the center direction (the direction toward rotation center of the indicator needle 4) of the light-guiding member 6 with the directivity, and the shapes and the numbers of the light-guiding portions 61 and 61a, etc., can be designed arbitrarily. Furthermore, the concavo and convex shapes of the light reflective portion 63 and 63a that reflect and guide the light beam emitted from the light source 7 which are formed at the rear face side of the light-guiding member 6 so that the light beams is directed toward a side from which a person views via the light-guiding portions 61 that are reflective surfaces of the light-guiding member 6, are not limited to the shapes described in respective embodiments, and can be designed arbitrarily like an embossed surface and a stripe pattern, and the positions thereof may also be set in accordance with respective shapes of the indicator panel 5 and the light-guiding member 6.

Note that in the above-described first and second embodiments, the indicator panel 5 is formed in a substantially circular shape, but can be changed and implemented in shapes, such as a square shape and an elliptical shape. At this time, by disposing the light-guiding member 6 in a superimposed manner in accordance with the shape of the indicator panel 5 at the front face side of the indicator panel 5, by forming the light-guiding portions 61 at predetermined portions of the outer circumferential portion of the light-guiding member 6 with intervals, and by forming, at the rear face of the light-guiding member 6, the light reflective portion 63 which reflects and guides the light beams emitted from the light source 7 so that the light beams is directed toward a side from which a person views via the light-guiding portions 61, the same working and effect as the above-described embodiments can be obtained. In this case, by causing light to be reflected and guided in shapes like stripes or lines in the center direction (the direction toward the rotation center of the indicator needle 4) of the light-guiding member 6 with directivity, or by causing light to be reflected and guided in shapes like strips or lines in different directions from the direction toward the rotation center of the indicator needle 4 with directivity in the same way as respective embodiments, it is possible to reflect light to shine as spots in the visual line direction via the light reflective portion 63 formed at the rear face of the light-guiding member 6, and in some cases, the directions of the linear or stripe-like shining areas may be set so as to intersect with each other, and thus it is possible to obtain a novel illumination effect in terms of the appearance.

INDUSTRIAL APPLICABILITY

Moreover, in the above-described embodiments, the explanation was given of the vehicular instrument and the instrument device of motorcycles as the example to which the present invention is applied, but the present invention is not limited to the vehicular instrument and can be applied the instrument device of boats and ships, or the instrument device of special vehicles, such as agricultural machines and construction machines.

This application is based on Japanese Patent Application No. 2009-147580 filed on Jun. 22, 2009. The entire specification, claims, and drawings of Japanese Patent Application No. 2009-147580 are incorporated herein by reference in this specification.

DESCRIPTION OF REFERENCE NUMERALS

1 Circuit board
2 Instrument main part
3 Rotation shaft
4 Indicator needle
5 Indicator panel
6 Light-guiding member
7 Light source
8 Casing
8a Reflector
8b Partition wall
9 Facing panel
41 Indicator member
42 Indicator basal part
43 Cover member
51, 51a indicator portion
52, 52a Ground-color portion
53, 53a Translucent portion
54, 54a Trough hole
55a Scale
61, 61a Light-guiding portion (reflective surface)
62 Convex scale
63, 63a Light reflective portion
64 Opening
64a Opening
P1 First printed layer
P2 Second printed layer
p1 First rear face printed layer
p2 Second rear face printed layer

The invention claimed is:

1. An instrument device comprising an indicator panel, an instrument main part which is disposed at a rear face side of the indicator panel, an indicator needle which is provided so as to rotate and give an indication in accordance with an operation of the instrument main part along a front face side of the indicator panel, a transparent light-guiding member which is disposed on the indicator panel and which can be seen through, and a light source which emits a light beam into the light-guiding member, wherein the light-guiding member is provided with a light-guiding portion which is disposed at an outer circumferential portion of the light-guiding member, and which reflects and guides the light beam from the light source inwardly to the light-guiding member with directivity, a light reflective portion which comprises a plurality of concavities and convexities is formed at a rear face of the light-guiding member, the light-guiding portion reflects and guides the light beam from the light source with directivity so that the light beam from the light source reaches a partial region of the light reflective portion, the partial region being a strip-shaped or linear region, the strip-shaped or linear region reached by the light beam from the light source is adapted to reflect and guide the light beam toward a viewer so that an area of the light reflective portion is observed to shine like a strip or a line when the instrument device is viewed from a front by the viewer, the light-guiding portion reflects and guides the light beam from the light source toward a center of rotation of the indicator needle, a scale indicated by the indicator needle is formed on the light-guiding member or in the indicator panel such that the scale is along a line which interconnects the light-guiding portion and the center of rotation of the indicator needle, and when the instrument device is viewed from the front, the area observed to shine like the strip or the line includes a portion extending from the scale toward the center of rotation.

2. The instrument device according to claim 1, wherein a first light-guiding portion and a second light-guiding portion that serve as the light-guiding portion are provided, and the scale is formed on the light-guiding member or in the indicator panel such that the scale is along a line which interconnects the first light-guiding portion and the center of rotation of the indicator needle and is not along a line interconnecting the second light-guiding portion and the center of rotation of the indicator needle.

3. The instrument device according to claim 1, wherein when the instrument device is viewed from the front, the indicator needle rotates passing across the portion that is observed to shine like the strip or the line and that extends from the scale toward the center of rotation.

4. The instrument device according to claim 1, wherein the scale is a convex scale which protrudes integrally from the light-guiding member.

5. The instrument device according to claim 4, wherein a translucent portion is formed at the portion of the indicator panel positioned behind the convex scale.

* * * * *